United States Patent
Setsuda (12)

(10) Patent No.: US 8,511,418 B2
(45) Date of Patent: Aug. 20, 2013

(54) ELECTRIC POWER STEERING SYSTEM

(75) Inventor: Satoshi Setsuda, Kashihara (JP)

(73) Assignee: JTEKT Corporation, Osaka-Shi (JP)

( * ) Notice: Subject to any disclaimer, the term of this patent is extended or adjusted under 35 U.S.C. 154(b) by 155 days.

(21) Appl. No.: 13/275,545

(22) Filed: Oct. 18, 2011

(65) Prior Publication Data

US 2012/0097474 A1 Apr. 26, 2012

(30) Foreign Application Priority Data

Oct. 20, 2010 (JP) .................................. 2010-235050
Mar. 25, 2011 (JP) .................................. 2011-066943
Oct. 7, 2011 (JP) .................................. 2011-222698

(51) Int. Cl.
*B62D 5/04* (2006.01)

(52) U.S. Cl.
USPC ........................................................ 180/444

(58) Field of Classification Search
USPC .................................. 180/443, 444
See application file for complete search history.

(56) References Cited

U.S. PATENT DOCUMENTS

2013/0075189 A1* 3/2013 Sekikawa et al. ............. 180/444

FOREIGN PATENT DOCUMENTS

| EP | 1 845 009 A1 | 10/2007 |
| JP | A-2005-035346 | 2/2005 |
| JP | A-2006-103636 | 4/2006 |
| JP | A-2010-064612 | 3/2010 |

OTHER PUBLICATIONS

Jun. 4, 2012 European Search Report issued in Patent Application No. EP 11185754.6.

* cited by examiner

*Primary Examiner* — Kevin Hurley
(74) *Attorney, Agent, or Firm* — Oliff & Berridge, PLC

(57) ABSTRACT

A gap adjustment mechanism that moves an upper housing in a direction close to a worm is disposed in a fitting portion between the upper housing and a lower housing. The gap adjustment mechanism is disposed in the fitting portion on the side of the worm or in the fitting portion on the other side of the worm.

6 Claims, 5 Drawing Sheets

ELECTRIC POWER STEERING SYSTEM

INCORPORATION BY REFERENCE

The disclosure of Japanese Patent Applications No. 2010-235050 filed on Oct. 20, 2010, No. 2011-066943 filed on Mar. 25, 2011, and No. 2011-222698 filed on Oct. 7, 2011 including the specifications, drawings and abstracts is incorporated herein by reference in its entirety.

BACKGROUND OF THE INVENTION

1. Field of the Invention

The present invention relates to an electric power steering system that utilizes a worm gear system.

2. Description of the Related Art

Conventionally, an electric power steering system that utilizes a worm gear system as shown in FIG. 5 is known. The electric power steering system includes an upper shaft 103 that is connected to a steering shaft 100 interlocking with a steering wheel and a lower shaft 102 that is coaxially connected to the upper shaft 103 via a torsion bar 101. When the steering wheel is operated, a torque detection device 110 detects the torque that is applied to the steering wheel based on the magnitude of torsion of the torsion bar 101, an electric motor 120 for steering assist is driven and controlled, based on the detected torque, and the rotation of the electric motor 120 is transmitted to the lower shaft 102 through a speed reduction mechanism that includes a worm 130 and a worm wheel 131.

The torque detection device 110 is housed in a sensor housing 140, and the worm 130 and the worm wheel 131 are housed in a wows housing 150. The sensor housing 140 supports the upper shaft 103 and the lower shaft 102 with rolling bearings 104 and 105, and the worm housing 150 supports the lower shaft 102 with a rolling beating 106. The sensor housing 140 and the worm housing 150 are fitted in a socket joint manner and coupled through bolts (not shown) that fasten the sensor housing 140 and the worm housing 150. (See FIG. 5 of Japanese Patent Application Publication No. 2006-103636.)

As described above, in order that the sensor housing 140 and the wow housing 150 are fitted by means of the socket joint and then both housings are fastened with bolts, a gap is required for the portion to be fitted. Furthermore, in order to fasten both of the housings with bolts, a gap through which a bolt passes is required in a bolt insertion hole. Due to the gap in the fitting portion and the gap of the bolt insertion hole, when the sensor housing 140 and the worm housing 150 axe fastened, there is a possibility that slight relative displacement between both housings occurs.

When such the relative displacement occurs, the distance between rotating shafts of the worm 130 and the worm wheel 131 may change, and an engagement gap between the worm 130 and the worm wheel 131 may vary. For example, when the sensor housing 140 and the worm housing 150 are fastened in the state that the engagement gap becomes large, rattle noise occurs easily due to backlash being increased.

SUMMARY OF THE INVENTION

The present invention made in view of the related art described above provides an electric power steering system in which the backlash between the worm and the worm wheel does not change because the engagement gap between the worm and the worm wheel varies in the assembly where an upper housing (the sensor housing) and a lower housing (i.e. the worm housing or a gear housing) are fastened.

According to one aspect of the present invention, the electric power steering system includes: an upper shaft that is connected to a steering wheel; a lower shaft that is coaxially connected to the upper shaft via a torsion bar; an electric motor that is driven and controlled, based on a torque applied to the steering wheel; a speed reduction mechanism that includes a worm and a worm wheel reducing the speed of rotation of the electric motor and transmitting it to the lower shaft; an upper housing that houses one end of the upper shaft and one end of the lower shaft; a lower housing that houses the speed reduction mechanism and the other end of the lower shaft; a fitting portion where a lower end of the upper housing and an upper end of the lower housing are loose-fitted with each other; a bolt that fastens the upper housing and the lower housing; and a gap adjustment mechanism that is disposed in the fitting portion and moves the upper housing to the lower housing in a direction perpendicular to an axis of the upper shaft and the lower shaft before fitting the upper housing and the lower housing by the bolt. Here, the electric power steering system further may include a bearing that supports the one end of the lower shaft and is loose-fitted to the upper housing.

According to the structure of the electric power steering system described above, since the upper housing can be moved to the lower housing in a direction perpendicular to an axis of the upper shaft and the lower shaft, the gap between the upper housing and the bearing is adjusted. Accordingly, a variation of the backlash between the worm and the worm wheel among products of the electric power steering system can be reduced.

In the electric power steering system described above, it is preferable that the gap adjustment mechanism includes an internal thread that is formed on the upper housing, a threaded hole that is formed in the lower housing, and an adjustment screw, and the gap adjustment mechanism adjusts a gap between the upper and lower housings in a direction perpendicular to an axis of the worm. It is also preferable that the gap adjustment mechanism adjusts an engagement gap between the worm and the worm wheel by which the adjustment screw is inserted into the threaded hole and threadedly engaged with the internal thread.

In the electric power steering system described above, it is preferable that the gap adjustment mechanism is provided in the fitting portion on the side of the worm. According to such the electric power steering system, the gap between the upper housing and the bearing can be adjusted by pulling the upper housing to the side of the worm.

In the electric power steering system described above, the gist of the present invention is that the gap adjustment mechanism is provided in the fitting portion on the other side of the worm. According to the electric power steering system that has the structure described above, the backlash between the worm and the worm wheel can be reduced by pushing the upper housing to the side of the worm.

The present invention provides an electric power steering system in which the backlash between the worm and the worm wheel does not change because the engagement gap between the worm and the worm wheel varies in the assembly where the upper housing and a lower housing are fastened. Accordingly, the assembly can be made in the state that the backlash between the worm and the worm wheel is maintained at a minimum.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

An embodiment of the present invention will be described with reference to the attached drawings.

Figure 1:
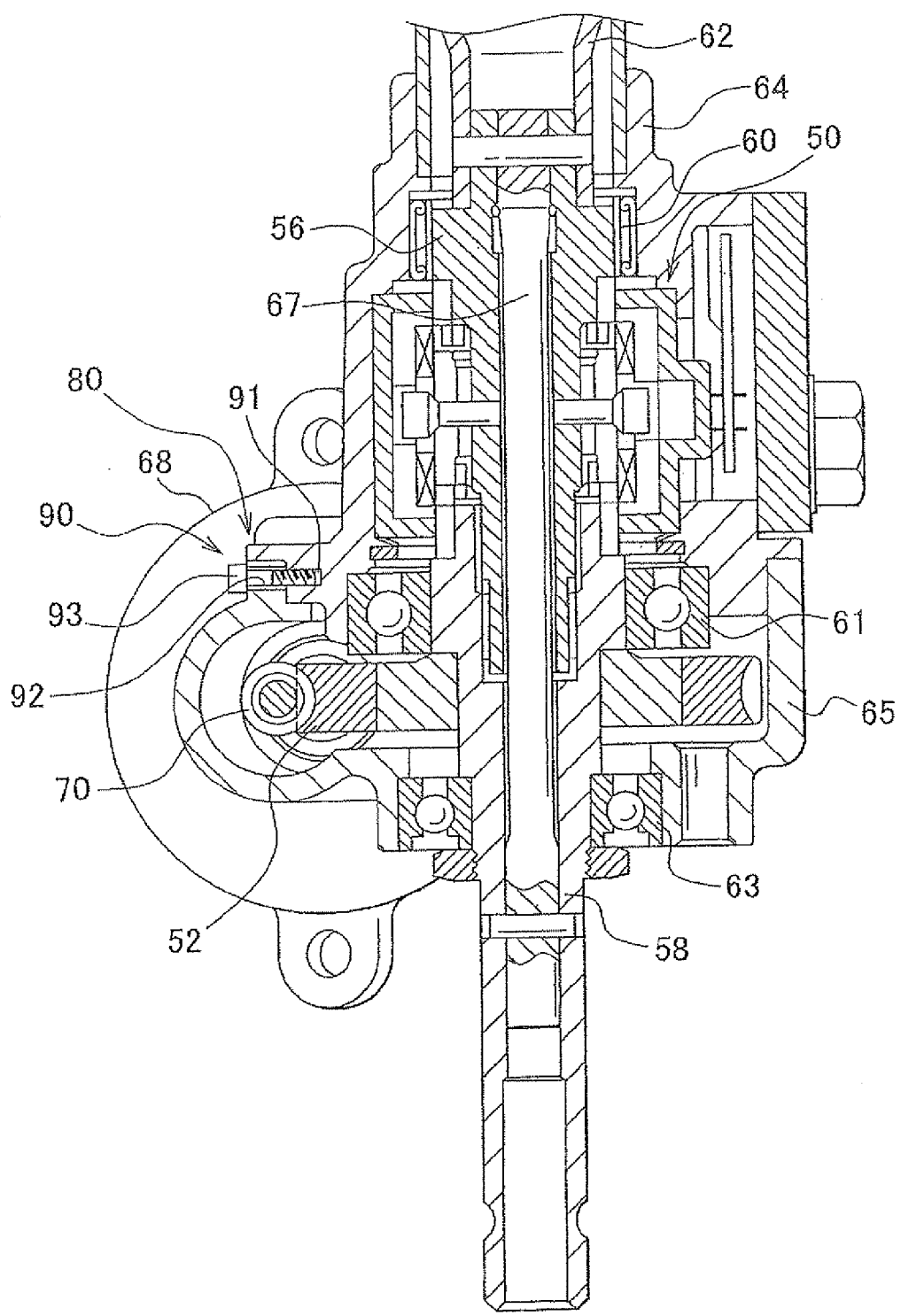
FIG. 1 is a cross-sectional view of the electric power steering system according to an embodiment of the present invention.

FIG. 1 is a cross-sectional view of the electric power steering system according to an embodiment of the present invention. The electric power steering system includes an upper shaft 56 that is connected to a steering shaft 62 interlocking with a steering wheel (not shown) and a lower shaft 58 that is coaxially connected to the upper shaft 56 via a torsion bar 67.

The electric power steering system also includes, a torque detection device 50 that detects the torque applied to the steering wheel based on the magnitude of torsion of the torsion bar 67, an electric motor 68 for steering assist that is driven and controlled, based on the torque detected by the torque detection device 50, and a Worm speed reduction mechanism that has a worm 70 and a worm wheel 52 reducing the speed of rotation of the electric motor 68 and transmitting it to the lower shaft 58.

The torque detection device 50 is housed in a sensor housing 64 as an upper housing, and the worm speed reduction mechanism that has the worm 70 and the worm wheel 52 is housed in a worm housing 65 as a lower housing. The sensor housing 64 supports the upper shaft 56 and the lower shaft 58 with rolling bearings 60 and 61, and the worm housing 65 supports the lower shaft 58 with a rolling bearing 63. The rolling bearing 61 is loose-fitted to the sensor housing 64.

Figure 2:
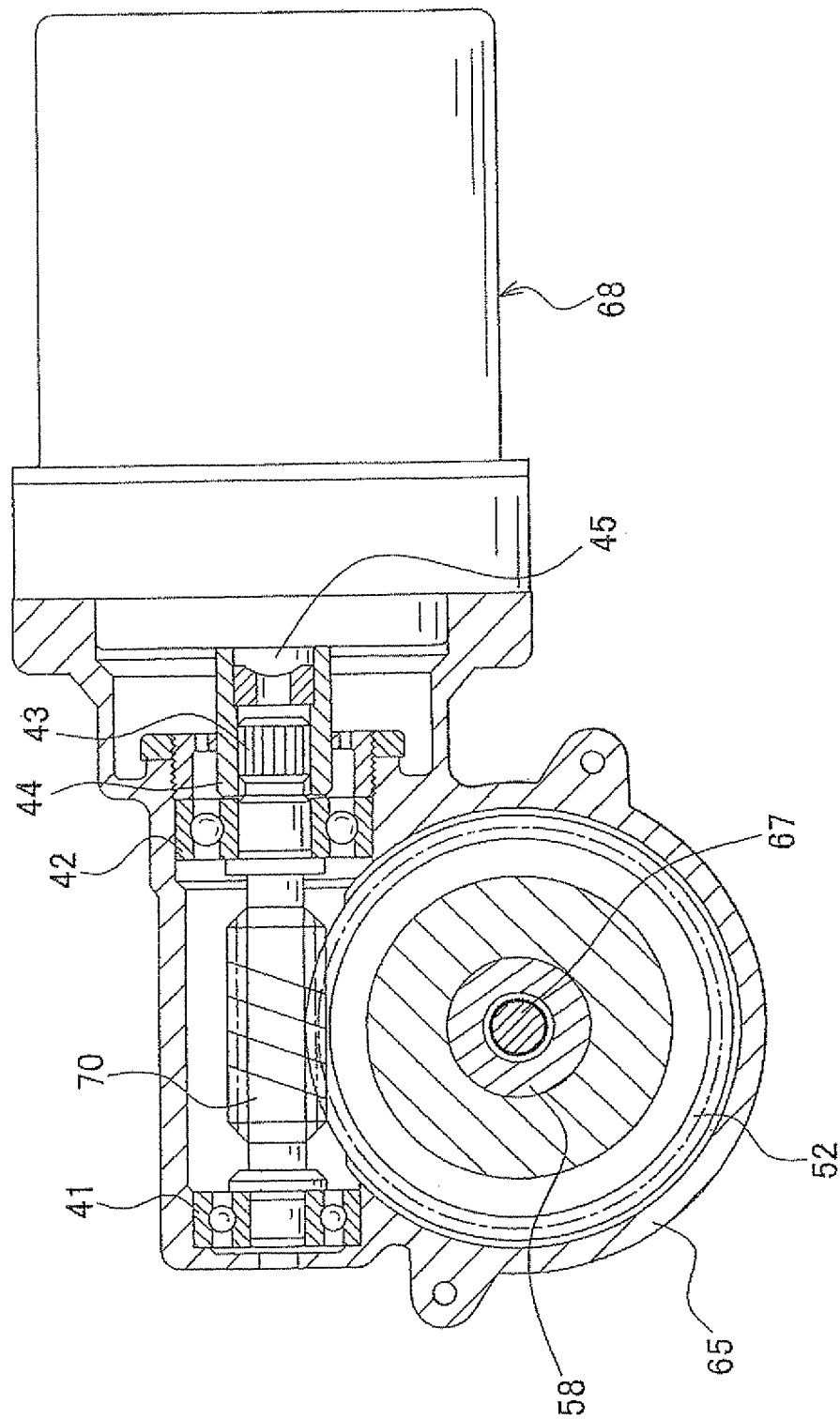
FIG. 2 is a partial transverse cross-sectional view of the electric motor and the worm speed reduction mechanism of the electric power steering system according to an embodiment of the present invention.

In the electric motor 68 and the worm speed reduction mechanism, as shown in FIG. 2 that is a partial transverse cross-sectional view of the electric motor and the worm speed reduction mechanism of the electric power steering system, one end of a motor shaft 45 of the electric motor 68 is fitted to a half of a cylindrical joint 44 for not rotating, and the other half of the joint 44 is formed with a number of grooves on the inner side thereof and fitted with one end of a worm shaft 43 that is formed with a number of grooves thereon.

The worm shaft 43 is supported in the worm housing 65 with rolling bearings 41 and 42, and the worm 70 is engaged with the worm wheel 52. The worn wheel 52 is coaxially press-fitted onto the lower shaft 58, and the torsion bar 67 is inserted into the hollow section that is formed in the shaft center part of the lower shaft 58.

The lower end of the sensor housing 64 is loose-fitted to the upper end of the worm housing 65, and a gap adjustment mechanism 90 as gap adjustment means is disposed in this fitting portion 80 between the sensor housing 64 and the worm housing 65 on the side of the worm 70. (See FIGS. 3A and 3B.) The gap adjustment mechanism 90 includes an internal thread 91 that is formed on the sensor housing 64, a threaded hole 92 that is formed in the worm housing 65, and an adjustment screw 93 that is inserted into the threaded hole 92 and threadedly engaged with the internal thread 91. Tightening the adjustment screw 93 allows the sensor housing 64 to move relatively to the side of the worm 70. The internal thread 91 and the threaded hole 92 viewed from above an axis of the steering shaft 62 extend in a direction perpendicular to an axis of the worm 70. The internal thread 91 and the threaded hole 92 are preferably in the vicinity of the meshing position of the worm 70 and the worm wheel 52.

After the relative movement between the sensor housing 64 and the worm housing 65 is adjusted by using the gap adjustment mechanism 90, both of the sensor housing 64 and the worm housing 65 are coupled through bolts (not shown) that fasten the sensor housing 64 and the worm housing 65.

Figure 3A:
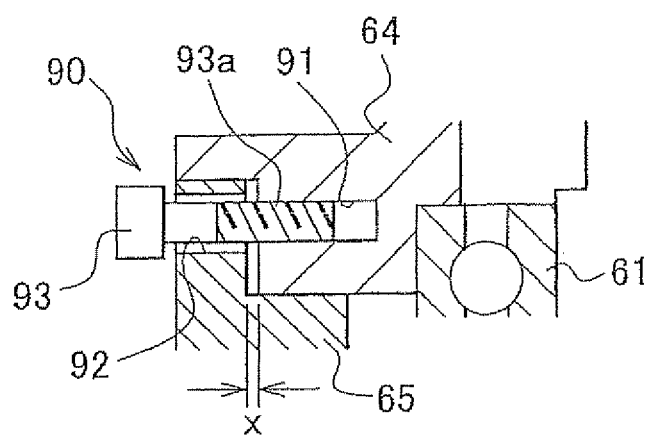
FIG. 3A and FIG. 3B are views that illustrate the operation of the gap adjustment mechanism according to the present invention.
Figure 3B:
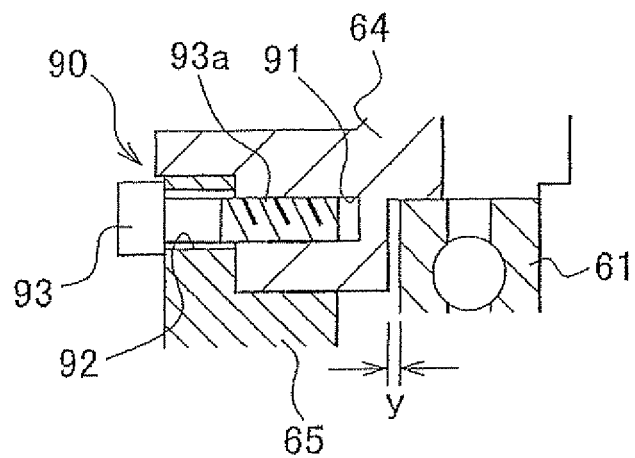

The operation of the gap adjustment mechanism 90 that has a structure described above will be described with reference to FIGS. 1, 3A, and 3B. Here, FIGS. 3A and 3B are illustrative drawings, and thus part of the details may differ from the view of FIG. 1 for better understanding; however, the basic structure is the same as that of FIG. 1. FIG. 3A shows a state before the adjustment by the gap adjustment mechanism 90, that is, a state where the sensor housing 64 and the worm housing 65 are fitted at the fitting portion 80 by means of the socket joint Here, although the gap x is shown between the sensor housing 64 and the worm housing 65 in FIG. 3A in order to explain simply and understandably, the gap x is a total value of the gaps between the sensor housing 64 and the worm housing 65 and between the sensor housing 64 and the rolling bearing 61. (The total value includes gaps of the right side unshown in FIG. 3A.) In this state, when the adjustment screw 93 is tightened, an external thread 93a that is formed on the adjustment screw 93 is threadedly engaged with the internal thread 91 that is formed on the sensor housing 64. Then, the sensor housing 64 is moved relative to the worm housing 65 in a direction such that the gap x between the sensor housing 64 and the worm housing 65 gets smaller.

As shown in FIG. 3B, at one position between the sensor housing 64 and the worm wheel 52 that is supported with the bearing 61 in the sensor housing 64, the sensor housing 64 moves in a direction such that the sensor housing 64 moves closer to the worm 70, and a gap between the sensor housing 64 and the bearing 61 is integrated as the gap y shown in FIG. 3B. Accordingly, since the gap which occurs at random in the cross section is integrated at the one position, the adjustment is made so that the variation of the backlash as an engagement gap between the worm wheel 52 and the worm 70 among products of the electric power steering system is reduced. After the completion of the adjustment of the gap between the sensor housing 64 and the bearing 61 as described above, both of the sensor housing 64 and the worm housing 65 are coupled through bolts (not shown) that fasten the sensor housing 64 and the worm housing 65. Here, the gap between the sensor housing 64 and the worm housing 65 is integrated at an unshown right side in the cross section of FIG. 3B.

According to this embodiment as described above, since the sensor housing 64 and the worm housing 65 are fixed after the adjustment of the gap between the sensor housing 64 and the bearing 61 by the gap adjustment mechanism 90, the backlash does not change at the fixation due to variations in the engagement gap between the worm wheel 52 and the worm 70.

Figure 4:
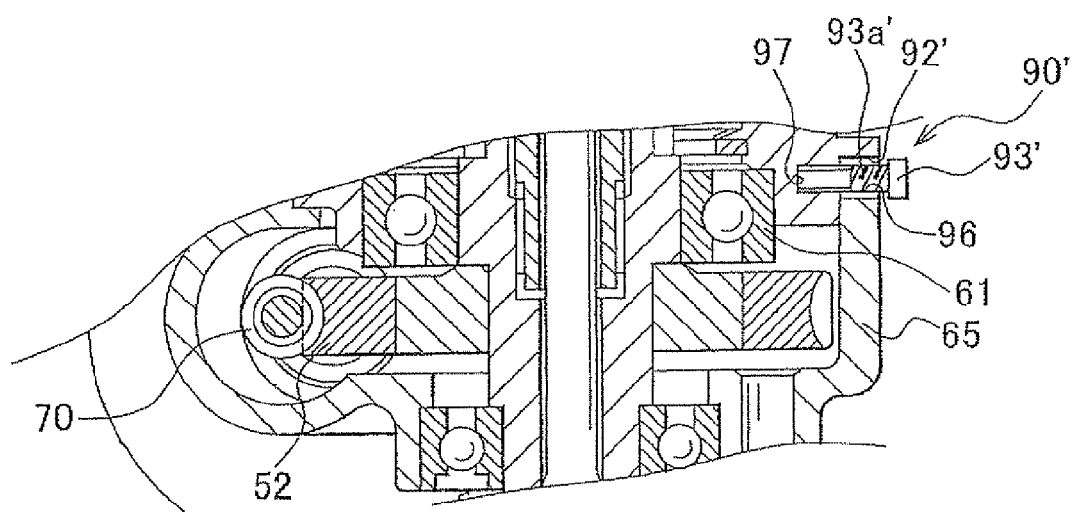
FIG. 4 is a cross-sectional view of the electric power steering system according to the other embodiment of the present invention.
Figure 5:
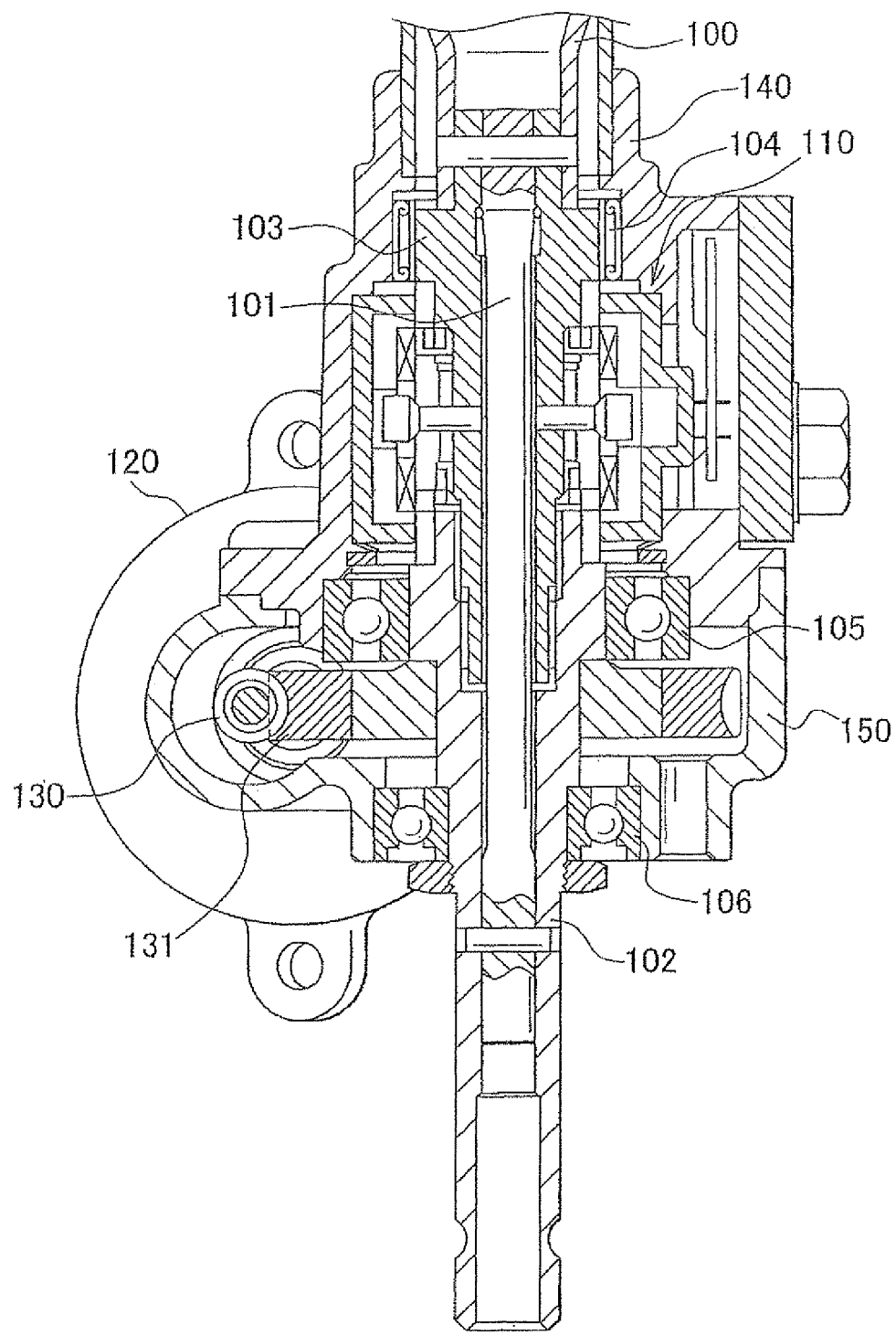
FIG. 5 is a cross-sectional view of the conventional electric power steering system.

In this embodiment, the gap adjustment mechanism 90 is disposed on the side of the worm 70 in the worm housing 65; however, as shown in FIG. 4 that is a partial cross-sectional view of the electric power steering system according to the other embodiment of the present invention, a gap adjustment mechanism 90' may be provided on the other side of the worm 70 in the worm housing 65. In this case, when an adjustment screw 93' of the gap adjustment mechanism 90' is tightened, an external thread 93a' on the adjustment screw 93' is threadedly engaged with an internal thread 95 that is formed on the worm housing, and the bottom portion of the adjustment screw 93' abuts against and presses a bottom section 97 of a recess that is formed in the sensor housing 64. Accordingly, the backlash between the worm wheel 52 and the worm 70 is adjusted.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An electric power steering system, comprising:
    an upper shaft that is connected to a steering wheel;
    a lower shaft that is coaxially connected to the upper shaft via a torsion bar;
    an electric motor that is driven and controlled, based on a torque applied to the steering wheel;
    a speed reduction mechanism that includes a worm and a worm wheel reducing the speed of rotation of the electric motor and transmitting it to the lower shaft;
    an upper housing that houses one end of the upper shaft and one end of the lower shaft;
    a lower housing that houses the speed reduction mechanism and the other end of the lower shaft;
    a fitting portion where a lower end of the upper housing and an upper end of the lower housing are loose-fitted with each other;
    a bolt that fastens the upper housing and the lower housing; and
    a gap adjustment mechanism that is disposed in the fitting portion and moves the upper housing to the lower housing in a direction perpendicular to an axis of the upper shaft and the lower shaft before fitting the upper housing and the lower housing by the bolt.

2. The electric power steering system according to claim 1; further comprising:
    a bearing that supports the one end of the lower shaft and is loose-fitted to the upper housing.

3. The electric power steering system according to claim 1, wherein
    the gap adjustment mechanism includes an internal thread that is formed on the upper housing, a threaded hole that is formed in the lower housing, and an adjustment screw, and the gap adjustment mechanism adjusts a gap between the upper and lower housings in a direction perpendicular to an axis of the worm.

4. The electric power steering system according to claim 3, wherein
    the gap adjustment mechanism adjusts an engagement gap between the worm and the worm wheel by insertion of the adjustment screw into the threaded hole and its threaded engagement with the internal thread.

5. The electric power steering system according to claim 1, wherein
    the gap adjustment mechanism is disposed in the fitting portion on the side of the worm.

6. The electric power steering system according to claim 1, wherein
    the gap adjustment mechanism is disposed in the fitting portion on the other side of the worm.

* * * * *